US008478276B1

(12) United States Patent
Koren et al.

(10) Patent No.: US 8,478,276 B1
(45) Date of Patent: Jul. 2, 2013

(54) METHODS FOR TRANSFERRING A COMMUNICATION SESSION BETWEEN COMPANION DEVICES

(75) Inventors: Eitan Koren, Raanana (IL); Abraham Tooba, Rishon Lezion (IL); Nira Yalon, Modiin (IL)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/337,242

(22) Filed: Dec. 26, 2011

(51) Int. Cl.
*H04W 36/00* (2009.01)
(52) U.S. Cl.
USPC .......................................... 455/440; 455/416
(58) Field of Classification Search
USPC ................... 455/414.1–417, 418–420, 422.1, 455/428, 432.1, 435.1–435.3, 436, 440, 444, 455/445, 458
See application file for complete search history.

(56) References Cited

U.S. PATENT DOCUMENTS

| | | | | |
|---|---|---|---|---|
| 7,729,489 | B2 * | 6/2010 | Lee et al. | 379/212.01 |
| 7,937,069 | B2 * | 5/2011 | Rassam | 455/406 |
| 8,064,892 | B1 * | 11/2011 | Zhou et al. | 455/416 |
| 2003/0003900 | A1 * | 1/2003 | Goss et al. | 455/417 |
| 2005/0048994 | A1 * | 3/2005 | Benco et al. | 455/517 |
| 2006/0166674 | A1 * | 7/2006 | Bennett et al. | 455/445 |
| 2007/0032225 | A1 * | 2/2007 | Konicek et al. | 455/417 |
| 2010/0111035 | A1 | 5/2010 | Eskicioglu et al. | |
| 2010/0113035 | A1 | 5/2010 | Eskicioglu et al. | |
| 2010/0113038 | A1 | 5/2010 | Eskicioglu et al. | |
| 2012/0149421 | A1 | 6/2012 | Korus et al. | |

OTHER PUBLICATIONS

Shah, N., "Femtocells & Relays in Advanced Wireless Networks," Jan. 5, 2010 accessed at http://www.4gwirelessjobs.com/articles/article-detail.php?Femtocells-&-Relays-in-Advanced-Wireless-Networks&Arid=Nzc=&Auid=Njk=, pp. 4.

* cited by examiner

*Primary Examiner* — Kashif Siddiqui
(74) *Attorney, Agent, or Firm* — Steven A. May

(57) ABSTRACT

A method for transferring a communication session between companion devices includes connecting to a communication session over a communication system using a current set of session parameters and an identifier for a portable wireless communication device. The portable wireless communication device is in an active mode for the communication session. The method also includes: detecting that the portable wireless communication device is within a range of a companion wireline communication device that is configured with the identifier for the portable wireless communication device; and synchronizing with the companion wireline communication device, wherein the synchronizing includes transferring the current set of session parameters to the companion wireline communication device. Additionally, the method includes receiving an indication that the companion wireline communication device is in the active mode for the communication session and, responsive to the indication, transitioning the portable wireless communication device to an inactive mode for the communication session.

20 Claims, 7 Drawing Sheets

METHODS FOR TRANSFERRING A COMMUNICATION SESSION BETWEEN COMPANION DEVICES

FIELD OF THE DISCLOSURE

The present disclosure relates generally to seamless mobility in a communication system and, in particular, to methods for transferring a communication session between companion devices.

BACKGROUND

Wireless communication device users (also referred to herein as subscribers and mobile users) use portable wireless communication devices (also referred to herein as portable devices) to access information or participate in group communication sessions to exchange media over wireless communication networks. Mobile users are often equipped with wireline (i.e., wired) communication devices (also referred to herein as wireline devices) that provide the same or similar functionality as the portable devices. For example, a Project 25 (P25) user can access a P25 communication system using either a portable device over a standard P25 common air interface (CAI) or a wireline device over a standard P25 wireline interface. While mobile users (such as public safety officers) naturally use their portable devices when they are on field missions out of their offices, they tend to switch to their wireline devices when they come back to their offices because the wireline devices are generally bigger in size and, thereby, less portable but offer more usage comfort.

When mobile users switch from their portable devices to wireline devices when they come back to their offices, or from wireline devices to portable devices when they leave their offices, it is desirable for the switch to be seamless. In other words, the switch between portable and wireline devices should not cause loss of or disruption to an ongoing communication session (e.g., an ongoing group call with other officers or a conference call established to handle a 911 emergency). Such seamless mobility and transition not only provides convenience to mobile users but is also imperative for some users, such as Public Safety users, to perform their duties.

Accordingly, there is a need for methods for transferring a communication session between portable devices and wireline companion devices.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
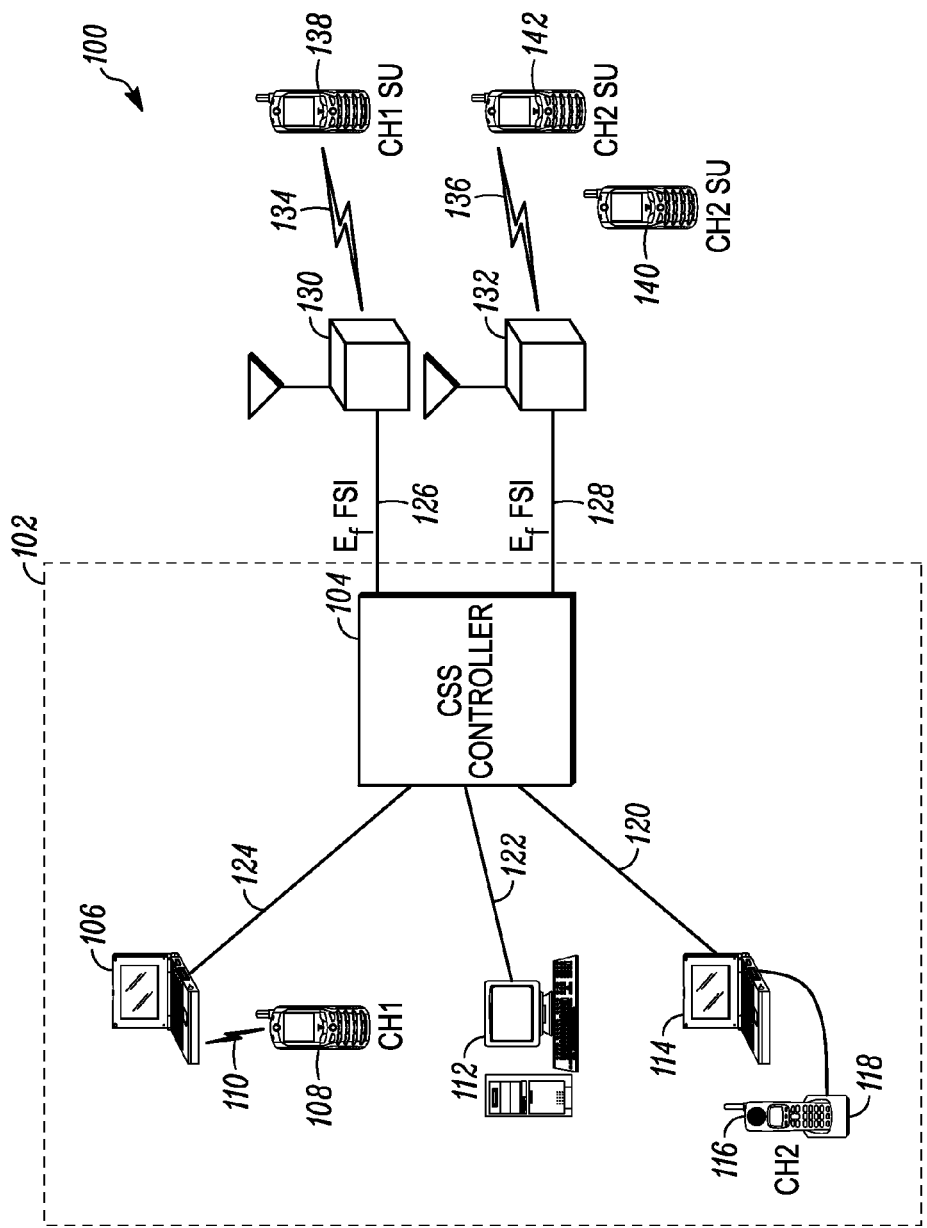
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for transferring a communication session between companion devices. In accordance with the present teachings, a method performed by a portable wireless communication device includes connecting to a communication session over a communication system using a current set of session parameters and an identifier (ID) for the portable wireless communication device, wherein the portable wireless communication device is in an active mode for the communication session. The method further includes detecting that the portable wireless communication device is within a range of a companion wireline communication device that is configured with the identifier for the portable wireless communication device, and synchronizing with the companion wireline communication device. The synchronizing comprises transferring the current set of session parameters to the companion wireline communication device to use with the identifier for the portable wireless communication device for connecting to the communication session. Moreover, the method includes receiving an indication that the companion wireline communication device is in the active mode for the communication session, and, responsive to the indication, transitioning the portable wireless communication device to an inactive mode for the communication session.

In a particular embodiment, the method may further include receiving a trigger and, responsive to the trigger, transitioning the portable wireless communication device from the inactive mode to the active mode for the communication session, wherein the companion wireline communication device correspondingly transitions to the inactive mode for the communication session. In one embodiment, the trigger may comprise a user selection for the portable wireless communication device to transition to the active mode. Alternatively, the trigger may comprise detecting that the portable wireless communication device is outside of the range of the companion wireline communication device. The method may also include the portable wireless communication device receiving an updated set of session parameters for the communication session from the companion wireline communication device while the companion wireline communication device is in the active mode and the portable wireless communication device is in the inactive mode. Additionally, the method may include the portable wireless communication device connecting to the communication session using the updated set of session parameters while the portable wireless communication device is in the active mode and the companion wireline communication device is in the inactive mode for the communication session.

In one embodiment, the current set of session parameters may comprise a channel identifier for a channel assigned for media transmissions of the communication session. Optionally, in a particular embodiment, detecting that the portable wireless communication device is within the range of a companion wireline communication device comprises detecting that the portable wireless communication device has a physical connection to the companion wireline communication device, and is receiving a battery charge through the physical connection. Additionally, the method may include registering with a console subsystem controller that is provisioned as a serving radio frequency subsystem for the portable wireless communication device and companion wireline communication device, wherein the registering is performed through the companion wireline communication device and the registering initiates a standard inter-system interface registration procedure between the console subsystem controller and a home radio frequency subsystem to connect the companion wireline communication device to the communication session using the current set of session parameters and the identifier for the portable wireless communication device. In a particular optional embodiment, the standard inter-system interface registration procedure comprises a Project 25 inter-RF subsystem interface registration procedure.

In one embodiment, the communication session may be a group call, and the current set of session parameters comprises an identifier for the group call. Alternatively, the communication session may be a unit-to-unit call, and the current set of session parameters comprises an identifier for a destination unit. In a particular embodiment, the current set of session parameters optionally comprises an emergency indication. Moreover, in a further embodiment, the synchronizing may be performed using a security key and a secure protocol.

Further in accordance with the present teachings, a method for transferring a communication session between companion devices is performed by a wireline communication device configured with an identifier for a companion portable wireless communication device. The method includes detecting that the companion portable wireless communication device is within a range of the wireline communication device, wherein the companion portable wireless communication device is in an active mode for a communication session, and the companion portable wireless communication device is connected to a communication system using the identifier for the companion portable wireless communication device and a current set of session parameters for the communication session. The method further includes synchronizing with the companion portable wireless communication device, wherein the synchronizing comprises receiving the current set of session parameters. Additionally, the method includes, responsive to user input, transitioning the wireline communication device to the active mode for the communication session, wherein the wireline communication device is connected to the communication system using the identifier for the companion portable wireless communication device and the current set of session parameters for the communication session, when the companion portable wireless communication device is disconnected from the communication session.

In a particular embodiment, the method may further comprise the wireline communication device periodically sending to the companion portable wireless communication device an updated set of session parameters for the communication session while the wireline communication device is in the active mode for the communication session, and the companion portable wireless communication device is simultaneously in the inactive mode for the communication session. In another embodiment, the method may also include detecting that the companion portable wireless communication device has left the range of the wireline communication device, and responsively transitioning the wireline communication device to the inactive mode for the communication session to allow the companion portable wireless communication device to transition to the active mode for the communication session, wherein the companion portable wireless communication device is connected to the communication system using the identifier for the companion portable wireless communication device and the updated set of session parameters for the communication session.

Detecting that the companion portable wireless communication device has left the range of the wireline communication device may comprise at least one of: failing to receive a beacon message from the companion portable wireless communication device; receiving a roaming message from a home radio frequency subsystem of the companion portable wireless communication device; or receiving an indication that a user has logged out of the wireline communication device. The method may further include de-registering from a console subsystem controller that is provisioned as a serving radio frequency subsystem for the wireline communication device and companion portable wireless communication device, wherein the de-registering initiates a standard inter-system interface de-registration procedure between the console subsystem controller and a home radio frequency subsystem.

Further in accordance with the present teachings, a method for transferring a communication session between companion devices is performed by a Project 25 console subsystem controller that is enhanced to function as a serving radio frequency subsystem for a portable wireless communication device and companion wireline communication device pair. The method includes receiving a registration request for the portable wireless communication device from the companion wireline communication device, wherein the companion wireline communication device is in an inactive mode for a communication session, and the portable wireless communication device is in an active mode for the communication session, wherein the registration request includes an identifier for the portable wireless communication device. The method further includes, responsive to receiving the registration request, sending a standard Project 25 inter-RF subsystem interface registration request that includes the identifier for the portable wireless communication device to cause the console subsystem controller to become registered with a home radio frequency subsystem for the portable wireless communication devices as the serving radio frequency subsystem for the portable wireless communication device, wherein the portable wireless communication device transitions to the inactive mode for the communication session and the companion wireline communication device transitions to the active mode for communicating media (such as, voice, text, video, etc.) over a standard Project 25 inter-RF subsystem interface between the console subsystem controller and the home radio frequency subsystem for the portable wireless communication device.

In a particular embodiment, the method may further include receiving an affiliation request for the portable wireless communication device from the companion wireline communication device, wherein the affiliation request includes the identifier for the portable wireless communication device and an identifier for a group call. In this optional embodiment, the method further includes, responsive to receiving the affiliation request, sending a standard Project 25 affiliation request that identifies the communication session to a home radio frequency subsystem for the group call to cause the Project 25 console subsystem controller to become the serving radio frequency subsystem for communicating media over a standard Project 25 inter-RF subsystem interface between the Project 25 console subsystem controller and the home radio frequency subsystem for the group call.

Figure 2:
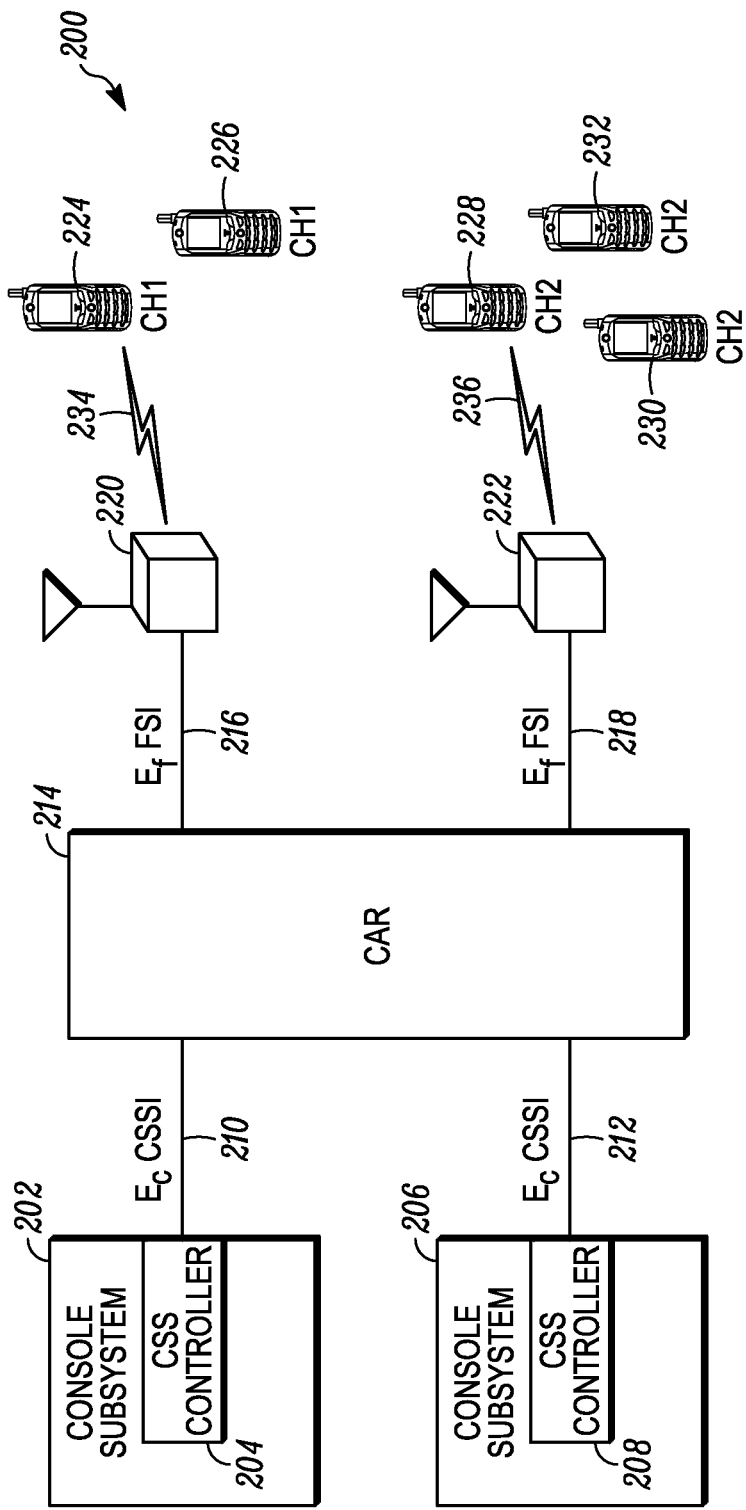
FIG. 2 illustrates a communication system implementing embodiments of the present teachings.
Figure 3:
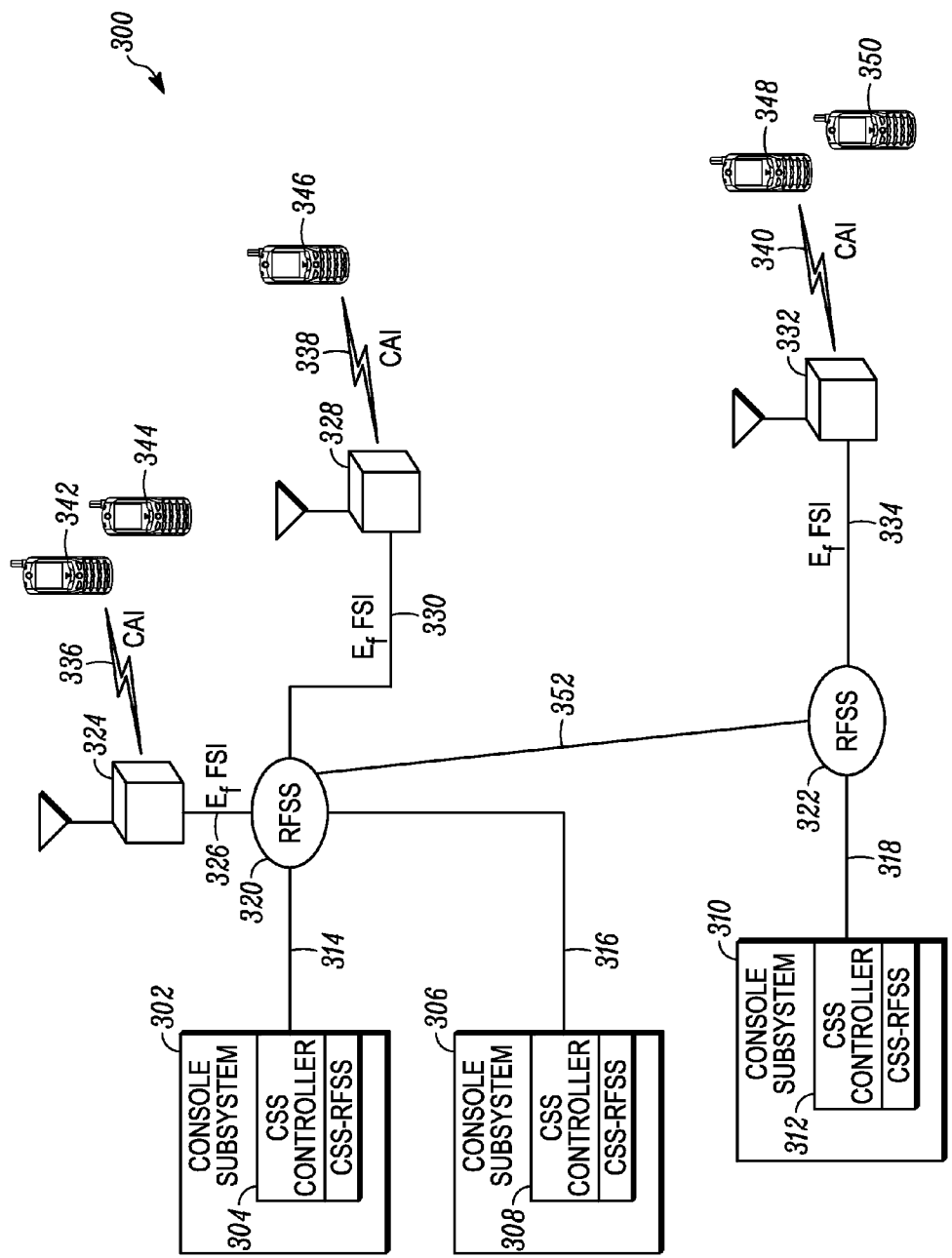
FIG. 3 illustrates a communication system implementing embodiments of the present teachings.

Referring now to the drawings, and in particular FIGS. 1-3, three illustrative communication systems implementing embodiments in accordance with the present teachings are shown and indicated generally at 100, 200, and 300, respectively. Only a limited number of system elements of FIGS. 1-3 are shown for ease of illustration; but additional such elements may be included in the communication systems 100, 200, and 300. For example, one or more databases may be included to provide relevant data, such as, preconfigured settings for portable devices and policies for data filtration and distribution. Moreover, other components needed for commercial embodiments of the systems 100, 200, and 300 are omitted from the drawings for clarity in describing the enclosed embodiments.

Furthermore, in this illustrative implementation, communication systems 100, 200, and 300 are Project 25 communication systems meaning that the system elements of each system are configured to operate in compliance with one or more aspects of the P25 technical specifications (TS) which are maintained by the Telecommunications Industry Association. However, the teachings herein are applicable to any communication systems providing access to both portable and wireline devices for subscribers. Such systems include Terrestrial Trunked Radio (TETRA) systems having system elements that are configured to operate in compliance with one or more aspects of the TETRA standards as published by the European Telecommunications Standards Institute. In addition, in the illustrative implementations described herein, a companion device pair comprises a portable wireless communication device and a wireline communication device. However, the teachings are equally applicable to other companion device pairs such as a portable wireless communication device and a mobile wireless communication device that a user operates from a vehicle.

Referring first to FIG. 1, the communication system 100 comprises a console subsystem (CSS) 102 that include a CSS controller 104 and three wireline devices 106, 112, and 114. System 100 further comprises five portable devices 108, 116, and 138-142, and two fixed stations (FS) 130 and 132. Comprising only one CSS, system 100 represents a P25 conventional complexity level simple architecture. In other words, the network complexity level of the communication system 100 is "simple." To exchange media with devices (e.g., 106, 112, and/or 114) within the CSS 102, the portable devices 138-142 communicate (i.e., exchange signaling and messaging) with the FSs 130 and 132 using a standard P25 CAI interface over radio frequency (RF) links 134 and 136, respectively. RF links 134 and 136 operate over different radio frequency channels (in this case CH1 and CH2, respectively). The FSs 130 and 132 communicate with the CSS controller 104 using a standard P25 fixed station interface (FSI, also known in the art as $E_f$) over wired connections 126 and 128, respectively.

Wireline devices (also referred to herein as console devices) 106, 112, and 114 connect to the CSS controller 104 over wired links 124, 122, and 120, respectively. One example wired link is an Ethernet network connection using a standard Ethernet RJ45 networking Cat5e cable. Moreover, CSS 102 contains two sets of "companion devices" that operate to affect transferring of communication sessions in accordance with the present teachings, for example, as described in further detail below with respect to FIGS. 4 and 5. More particularly, the wireline device 106 and the portable device 108 are companion devices; and the wireline device 114 and the portable device 116 are companion devices. Companion devices can communicate using wireless or wired connections. For example, as shown in FIG. 1, the wireline device 106 communicates with the portable device 108 over a wireless link (e.g., Bluetooth) 110, and the wireline device 114 communicates with portable device 116 over a physical (or wired) connection 118. In one embodiment (as shown), the wired link 118 is a universal serial bus (USB) cradle capable of charging the battery of the portable device 116 and connecting the portable device 116 to the wireline device 114 using a USB interface.

The portable devices 108, 116, and 138-142 are mobile communication devices that facilitate communication of media to mobile users. The portable devices are also commonly referred to in the art as mobile devices, access devices, access terminals, mobile stations, mobile subscriber units, subscriber units (SU), user devices, and the like, and can be any type of communication device such as radios, mobile phones, mobile data terminals, personal digital assistants (PDAs), laptops, two-way radios, cell phones, etc. Each portable device is generally provisioned with a unique identifier which is commonly referred to in the art as a subscriber unit identifier (SUID).

The wireline devices 106, 112 and 114 are console devices that facilitate communication of media to stationary users (i.e., subscribers). Wireline devices can be any type of communication device, such as, laptop computers, desktop computers, terminals, etc. In one illustrative implementation, the wireline devices connect to the CSS controller 104 using Transmission Control Protocol/Internet Protocol (TCP/IP), User Datagram Protocol/Internet Protocol (UPD/IP), or IP over Ethernet network links.

The CSS controller 104 arbitrates and distributes voice messages to all wireline devices 106, 112, and 114. As used herein, arbitration means that a CSS controller solves contention scenarios between the wireline devices connected to the CSS controller. Within system 100, each individual wireline and portable device receives the voice messages and filters the received voice messages based on local policies, such as destination identifiers, group IDs, etc. For example, where a voice message is associated with a communication group not including the portable device 138 (based on the filtered group ID), the portable device 138 drops the voice message after reception but retains messages for communication groups that include the portable device 138. Similarly, if a message associated with a unit-to-unit call is not intended for the portable device 138 (based on the filtered destination ID), the portable device 138 drops the message but retains messages for unit-to-unit calls where it is the intended destination unit.

The FSs 130 and 132 facilitate communications between devices (wireline or portable) by bridging communications between the CSS 102 and portable devices.

Referring now FIG. 2, the communication system 200 comprises two CSSs 202 and 206 that include two CSS controllers 204 and 208, respectively. System 200 further comprises a conventional arbitrator (CAR) 214, two FSs 220 and 222, and five portable devices 224-232. The CSSs 202 and 206 are similar in architecture to the CSS 102 of FIG. 1. Accordingly, system 200 includes a plurality of wireline devices (not shown) connecting to the CSS controllers 204 and 208. One or more of these wireline devices have companion portable devices, wherein the companion devices operate to affect transferring of communication sessions in accordance with the present teachings, for example, as described in further detail below with respect to FIGS. 4 and 5.

Comprising more than one CSS and a CAR, system 200 represents a P25 conventional complexity level 1 architecture. In other words, the network complexity level of the communication system 200 is 1. To exchange media with devices within the CSSs 202 or 206, the portable devices 224-232 communicate with the FSs 220 and 222 using the standard P25 CAI interface over radio frequency links 234 and 236, respectively. RF links 234 and 236 operate over different radio frequency channels (in this case, CH1 and CH2, respectively). The FSs 220 and 222 communicate with the CAR 214 using the standard P25 FSI interface over wired connections 216 and 218, respectively. The CAR 214 communicates with the CSSs 202 and 206 using a standard P25 console subsystem interface (CSSI, also known in the art as $E_c$) over wired links 210 and 212, respectively.

The CAR 214 provides arbitration between the CSSs 202 and 206, as well as distribution of media to the CSSs 202 and 206. Each of the two CSSs 202 and 206 provides its own internal arbitration between and distribution of media to wireline devices (not shown) using the CSS controllers 204 and 208, respectively. Within system 200, voice messages are sent to all connected wireline and portable devices. Each wireline and portable device in system 200 filters messages (e.g., voice messages) based on local policies, as described above.

Referring now to FIG. 3, the communication system 300 comprises three CSSs 302, 306, and 310 that include three CSS controllers 304, 308, and 312 respectively. System 300 further comprises two radio frequency subsystems (RFSS) 320 and 322 that communicate with each other using a standard P25 inter-RF subsystem interface (ISSI) over a network link 352. ISSI is also referred to herein as an inter-subsystem interface and an inter-system interface. In TETRA standards, the corresponding interface is referred to as ISI. Comprising a RFSS, system 300 represents a P25 conventional complexity level 2&3 or trunking system architecture. In other words, the network complexity level of the communication system 300 is 2&3 or "trunking." The CSSs 302, 306, and 310 are similar in architecture as CSS 102 of FIG. 1. Accordingly, system 300 includes a plurality of wireline devices (not shown) connecting to the CSS controllers 304, 308, and 312. One or more of these wireline devices have companion portable devices, wherein the companion devices operate to affect transferring of communication sessions in accordance with the present teachings, for example, as described in further detail below with respect to FIGS. 6 and 7.

In addition, system 300 comprises three FSs 324, 328, and 332 and five portable devices 342-350. To exchange media with devices within the CSSs 302, 306, or 310, the portable devices 342-350 communicate with the RFSSs 320 and 322 through the FSs 324, 328, and 332 using the standard P25 CAI interface over radio links 336-340, respectively. The FSs 324, 328, and 332 communicate with the RFSSs 320 and 322 using the standard P25 $E_f$ interface over network links 326, 330, and 334, respectively. The RFSSs 320 and 322 communicate with the CSSs 302, 306, and 310 using the standard CSSI ($E_c$) and/or ISSI (G) interfaces over network links 314-318, respectively. Further in accordance with the present teachings, an emulated RFSS (termed herein as CSS-RFSS) is provided in each of the CSS controllers 304, 308, and 312. Each CSS-RFSS may connect to and serve one or more pairs of companion devices. Accordingly, in contrast to the CSS controllers 104, 204, and 208, the CSS controllers 304, 308, and 312 are enhanced and modified CSS controllers. The CSS-RFSS can be implemented in software, firmware, or hardware. In addition to the enhanced CSS controllers 304, 308, and 312, the system 300 may include one or more standard P25 CSS controllers, such as the CSS controllers 104, 204, and 208.

Each RFSS, including the CSS-RFSS, is assigned a unique P25 RFSS system ID. A RFSS can either be a home RFSS or a serving RFSS to a portable device. Where a RFSS provisions a subscriber and has access to the subscriber's connectivity information (e.g., session parameters and affiliated communication groups) and directory information (e.g., confidential user login data), the RFSS is termed as a home RFSS for portable devices used by the subscriber. A RFSS that is outside of the coverage area of the home RFSS of a portable device, but provides a wireless connection to the underlying communication system for the portable device, is termed herein as a serving RFSS for the portable device. The coverage area of a RFSS is defined herein as the collective radio coverage areas of the FSs that are connected to the RFSS. For example, assuming the RFSS 322 is the home RFSS for the portable device 342, where the portable device 342 roams to the FS 324 and connects to the communication system 300 using the RFSS 320, the RFSS 320 becomes a serving RFSS for the portable device 342.

For example, where one portable device calls another portable device (i.e., a unit-to-unit call) over the communication system 300, the calling serving RFSS (meaning the serving RFSS for the calling portable device) establishes a call segment (meaning a logical connection between two RFSSs) with the calling home RFSS (meaning the home RFSS for the calling portable device). The calling home RFSS then establishes a call segment with the called home RFSS (meaning the home RFSS for the called portable device). Moreover, the called home RFSS establishes a call segment with the called serving RFSS (meaning the serving RFSS for the called portable device). When either portable device roams into the coverage area of a new serving RFSS, the call segment between the portable device's serving RFSS and home RFSS is redirected to the new serving RFSS.

In another example, where a communication group engages in a group call, a home RFSS (i.e., a group home RFSS) is assigned for the group call based on either home RFSS allocation policies or predetermined configurations. Each participating subscriber connects to the group call through his current serving RFSS which connects to the group home RFSS. When a participating portable device roams to the coverage area of a new serving RFSS, the call segment between the current serving RFSS and the group home RFSS is terminated, and a call segment between the new serving RFSS and the group home RFSS is established.

In general, as used herein, the communication devices, subsystems, and other system elements of systems 100, 200, and 300 or their hardware being "configured" or "adapted" means that such elements are implemented using one or more (although not shown) memory devices, network interfaces, and/or processing devices that are operatively coupled, and which, when programmed, form the means for these system elements to implement their desired functionality, for example, as illustrated by reference to the methods shown in FIGS. 4-7. The network interfaces are used for passing signaling also referred to herein as messaging (e.g., messages, packets, datagrams, frames, superframes, and the like) containing control information, voice or non-voice media between the elements of the communication systems 100, 200, and 300. The implementation of the network interface in any particular element depends on the particular type of network, i.e., wired and/or wireless, to which the element is connected. For example, the portable devices contain wireless interfaces to wirelessly attach to the FSs, and there are wired interfaces between at least some of the infrastructure devices contained in the systems 100, 200, and 300.

The wireless network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing devices utilized by the elements of systems 100, 200, and 300 may be partially implemented in hardware and, thereby, programmed with software or firmware logic or code for performing functionality described by reference to FIGS. 4-7; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a detailed description of the functionality of the elements of the systems 100, 200, and 300 in accordance with the teachings herein and by reference to the remaining FIGS. 4-7. Subscribers, such as P25 subscribers, can access a communication system to participate in communication sessions using a portable device or a wireline device. Each device is provisioned with its own unit or device identifier that is used to access the communication system to connect to (i.e., join) a communication session and, thereby, establish a session leg. Accordingly, when a user joins a session using his portable device, the user connects to the wireless system using the portable ID. However, while using the portable device, if the user comes into his office (for instance) and wants to instead use his wireline device to continue participating in the session, the user typically disconnects the portable device from the session by terminating the session leg for the portable device. For example, the user terminates the session by pressing an "End" button on the portable device which then sends a session termination message to communication system.

To reconnect to the session, the user then uses the wireline device to connect to the communication system and to the session using the ID for the wireline device. This, of course, causes a disruption in communications for the user because the wireline device has to spend some time learning of session parameters to join the session and spends further time exchanging the requisite session control signaling to establish a new session leg to connect to and continue participating in the ongoing session. Accordingly, a "disruption" in session participation is characterized by and synonymous with a user having to join and participate in the same ongoing session using two different device identifiers.

Such a disruption in ongoing session participation is eliminated in accordance with the present teachings. Instead, a "seamless" transition between devices for an ongoing session is affected, whereby only one device identifier is used to connect to and join the session even though the user uses two or more different devices (e.g., at least one portable device and at least one wireline device) to participate in the ongoing session, wherein the different devices are termed herein as "companion devices". As used herein, companion devices are defined as at least two devices (e.g., one portable device and one wireline device) that are mutually configured as companion devices and provisioned with a companion setting (meaning a set of companion configurations). Companion devices communicate with each other over a Personal Area Network (PAN), such as Bluetooth or USB links. A companion setting includes at least the portable identifier of each portable device of the corresponding companion devices so that both devices can use the portable's device identifier (e.g., a subscriber unit ID) to communicate in the same ongoing communication session.

It should be noted that a wireline device can have multiple companion portable devices, and a subscriber, via a subscriber ID, can be uniquely associated with certain companion devices by way of the identifiers of his associated companion devices. Besides the portable ID, the set of companion configurations can include, but are not limited to, radio frequency channel parameters (e.g., channel ID), an aliasing name, a talkgroup list, a network complexity (e.g., complexity level 1), a home RFSS for complexity level 2&3 or trunking communication systems, and one or more authentication keys.

The home RFSS configuration in a companion setting facilitates registration and deregistration procedures when a subscriber switches between companion devices. The talkgroup list, provisioned into a device, is a list of talkgroups that the subscriber is allowed to affiliate with (meaning join or participate in). The authentication key is used by each of the companion devices to authenticate its companion device. The companion configurations as well as session parameters transferred between the companion devices are used to affect a seamless transfer of a communication session between the companion devices in accordance with the present teachings. When switching during an ongoing communication session, only one companion device is in an active mode, which allows or enables the device to participate in the communication session, and all other companion devices are in an inactive mode for the communication session. Correspondingly, the devices in the inactive mode are prevented from participating in the communication session.

For example, while participating in a group call session using the portable device 108, a mobile user switches to the wireline device 106 to continue his participation in the group call session when the portable device 108 of the mobile user roams within range of the wireline device 106. Accordingly, the wireline device 106 switches or transitions from an inactive mode to an active mode, while the portable device 108 switches from the active mode to the inactive mode for the group call session. Conversely, when the portable device 108 roams away (meaning leaves) from the wireline device 106, the portable device 108 transitions to the active mode while the wireline device 106 transitions to the inactive mode for the group call session.

As used herein, a communication session (also interchangeably referred to as a session) is a series of interactions or communications between a plurality of communication devices wherein the interactions are associated with an identifier (e.g., a session identifier, a group ID, a group name, a list of group participants, etc.) and occur between a time that the session is initiated and a time that the session is terminated, using any suitable session control signaling. For example, a session is created when the communication devices start communication, and end when the communication devices terminate communication. A communication device joins a communication session (using its device ID) and establishes a session leg and its communications, thereby, become associated or affiliated with the communication session. The session leg is terminated when the communication device (using its device ID) leaves the communication session. A session is described by a set of session parameters that may include, but are not limited to, a session ID, SUID of each participant of the session, a communication group ID, parameters (e.g., channel ID) of RF channels assigned for media transmission during the communication session, etc.

Moreover, where the session is a group call, the session parameters further include an ID for the group call. The session parameters can also include an emergency indication that is, for example, a flag embedded within the call signaling. This flag indicates that the group call is established for handling an emergency (e.g., a fatal traffic accident). Similarly, where the session is a unit-to-unit call, the session parameters include the SUID for the destination unit (meaning the called unit). The session parameters may also include the SUID for each participating device. As used herein, a group is a communication group, and comprises a number of members (e.g., subscribers) and each member uses a portable or wireline device to participate in a communication session.

Figure 4:
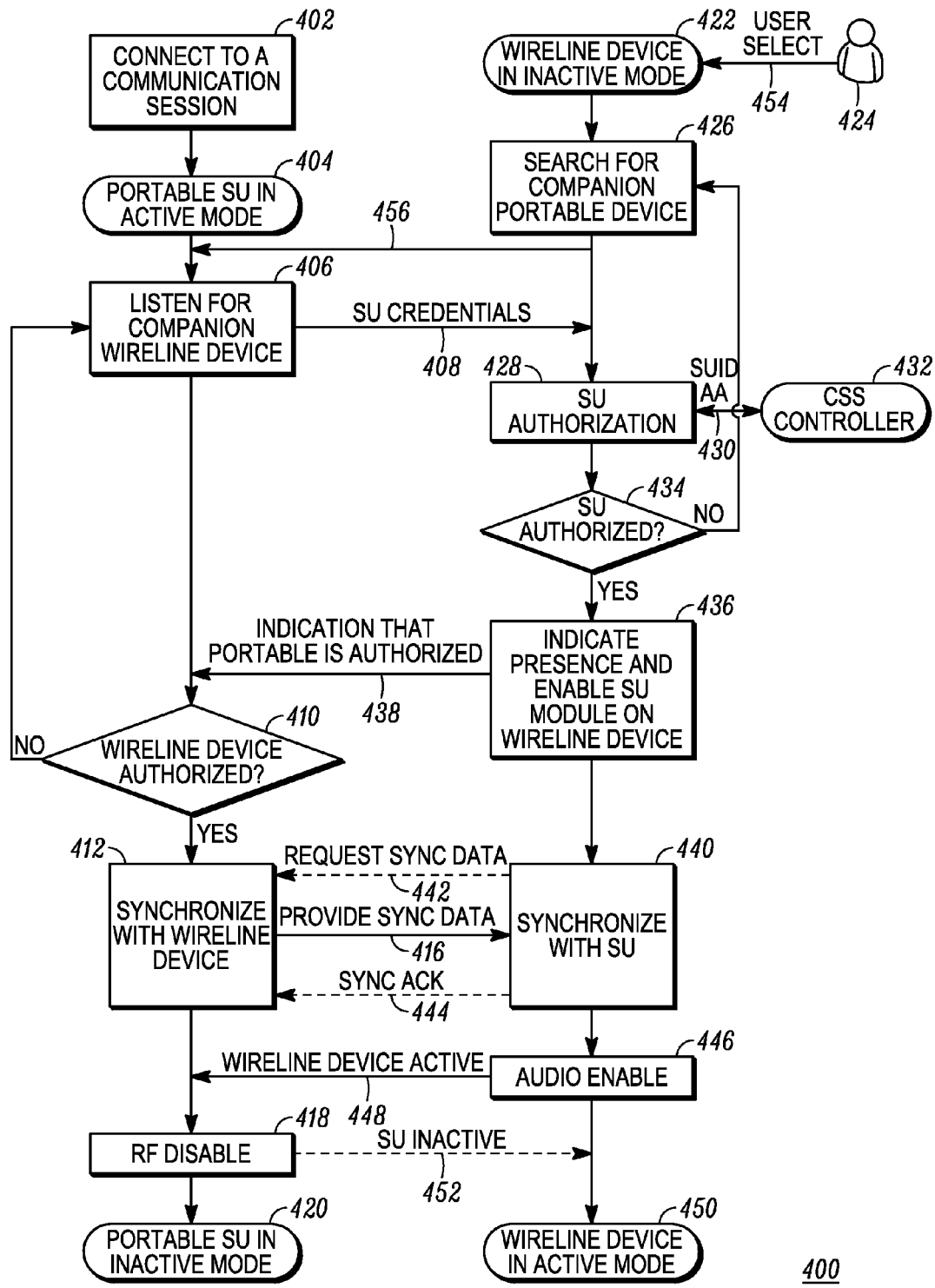
FIG. 4 is a logical flowchart illustrating a method for transferring a communication session between companion devices in accordance with some embodiments.
Figure 5:
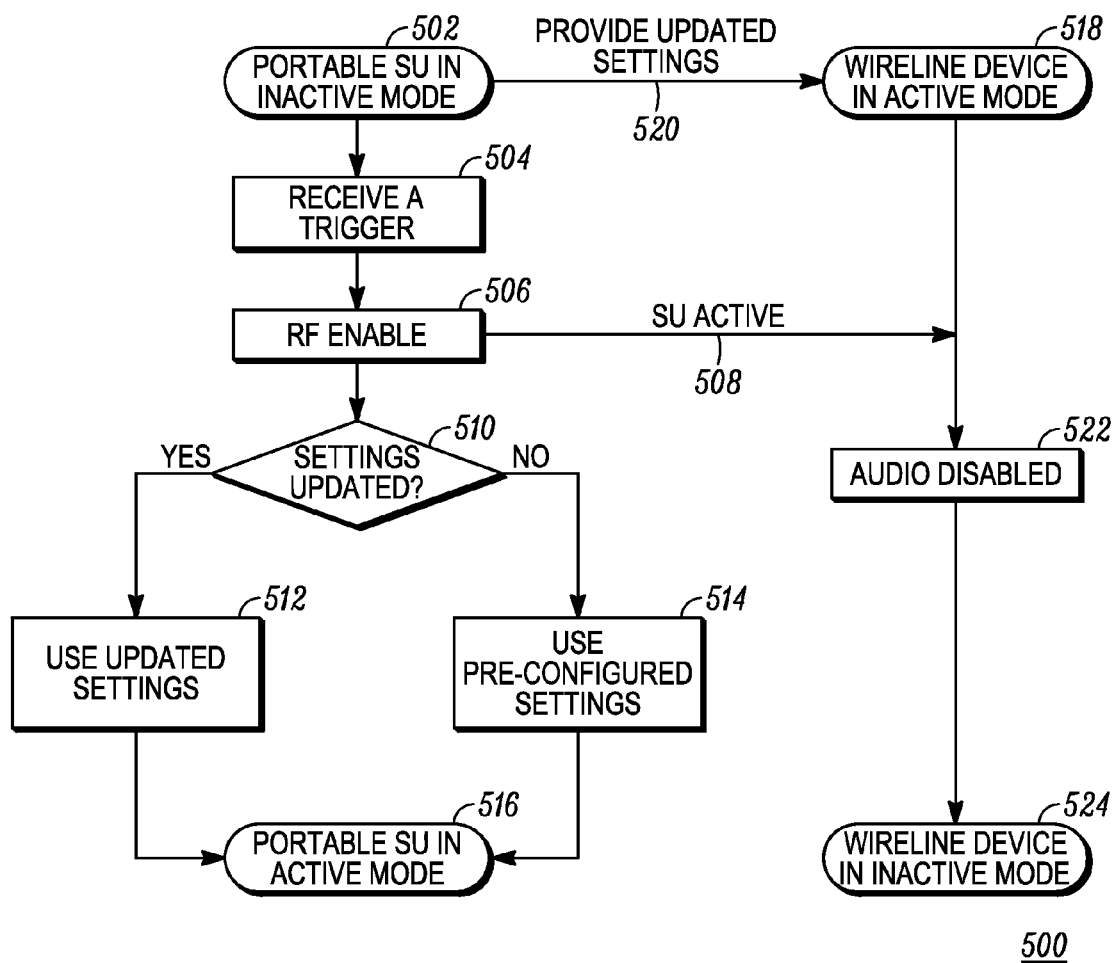
FIG. 5 is a logical flowchart illustrating a method for transferring a communication session between companion devices in accordance with some embodiments.

Turning now to FIGS. 4 and 5, each shows a logical flowchart illustrating a method for transferring a communication session between companion devices in accordance with some embodiments. Both method 400 and method 500 are performed by two companion devices, a portable device and a wireline device (e.g., the portable device 108 and the wireline device 106), within the communication system 100 or 200. Turning first to method 400, at 402, a subscriber 424 of the pair of companion device uses the portable device (also referred to herein and in FIGS. 4-7 as a portable SU) to connect to a communication session, such as a group call or a unit-to-unit call. To connect to the session, the portable device exchanges the requisite session control signaling using a set of session parameters, provisioned to the portable device, which the portable device currently maintains. Accordingly, this set of session parameters is termed herein as a current set of session parameters. Session parameters include, but are not limited to, a session identifier and a channel ID for a channel (i.e., RF channel).

Upon successful joining the session, the portable device is considered as being in an active mode for the communication session, at 404. While the portable device is in the active mode, its companion device (in this case the wireline device) is correspondingly and at least for some portion of time simultaneously in an inactive mode, at 422, for the communication session. Moreover, while in the inactive mode, the wireline device, at 426, keeps searching for its companion portable device by periodically sending out beacon messages. The beacon messages indicate the presence of the wireline device. While the subscriber 424 is participating in the session using the portable device, at 406, the portable device keeps listening (meaning waiting to receive messages from the wireline device over a PAN between them) for the wireline device.

Where the portable device and the wireline device are in a close enough range of each other (for example through an established wireless or wired connection), the wireline device receives a SU credentials message 408. In such a case, the companion devices are termed to have detected each other. For example, where the portable device 116 is plugged in the USB cradle 118, or the portable device 108 is close enough to be able to connect to the wireline device 106 over the Bluetooth link 110, each device detects its companion device. In such a case, each device is termed to be in a "range" of its companion device. The devices are within "range" when they can detect messaging from one another and the "range" is generally determined by the type of connection used. For example, the devices are within wireline "range" when they are properly connected using, for example, a USB link, and the wireline messages are obtainable by each device. The devices are within "range" in a Bluetooth connection, when they are close enough to receive the messages via the Bluetooth connection.

The devices detecting each other includes the portable device receiving a beacon message 456 from the wireline device when they are within range and the portable device responsively sending the SU credential message 408 that is received by the wireline device. The message 408 indicates the presence of the portable device and comprises the SUID of the portable device. Moreover, other credentials (such as a security key) of the portable device may be included in the message 408.

When the wireline device receives the credentials of the portable device, the wireline device authenticates (428) the portable device to prevent network attacks. Additionally, source authentication (such as X.509 certificate based authentication) information is embedded in every message exchanged between companion devices in accordance with the present teachings. Source authentication is performed using a security key (such as RSA public and private keys) and a secure protocol (such as transport layer security (TLS)). At 428, the wireline device performs subscriber unit authorization for the portable device by sending an authentication and authorization (AA) request 430 to a CSS controller 432. Responsively, the wireline device receives an authentication and authorization result 430 from the CSS controller 432.

At 434, the wireline device determines whether the portable device is authorized to access the underlying communication system through the wireline device, based on the response 438 from the CSS controller 432. If the portable device is not authorized to do so, the wireline device, at 426, continues to search for its companion portable device by sending out beacon messages. Otherwise, at 436, the wireline device indicates its presence to the portable device by sending an indication 438 that the portable device is authorized as a companion device to the wireline device. The indication 438 further indicates that the wireline device is ready to synchronize with the portable device. Additionally, the wireline device, at 436, enables SU modules (such as computer program components) to support synchronization with its companion device and seamless transferring of the communication session between the companion devices.

Responsive to the message 438, the portable device, at 410, determines whether the portable device has been successfully authorized. Where the portable device is not successfully authorized, the portable device continues to search for its companion device, at 406. Otherwise, the portable device, at 412, synchronizes with the wireline device by transferring synchronization data 416 to the wireline device. At 440, the wireline device receives and processes the synchronization data. Moreover, the wireline device may send a synchronization acknowledgement 444 to the portable device. Alternatively, the wireline device, at 440, initiates the synchronization by sending a synchronization request 442 to the portable device. In response to the request 442, the portable device, at 412, transfers the synchronization data 416 to the wireline device. Synchronization data includes, but is not limited to, session parameters such as RF parameters (e.g., channel ID). Moreover, synchronization data may include companion configurations. Like any other messages exchanged between the companion devices, the messages 416, 442, and 444 may be exchanged using a security key (such as RSA public and private keys) and a secure protocol (such as TLS). Accordingly, in such a case, the synchronizing between the companion devices is performed using a security key and a secure protocol.

The wireline device allows the subscriber to select (454) the wireline device to continue his ongoing communication session. For example, the subscriber selects the wireline device by clicking a button in a user interface (UI) to a computer program running on the wireline device. The clicking of the button is a user input. Accordingly, at 454, the subscriber selects the wireline device to connect to the underlying communication system. Responsive to the selection, the wireline device, at 440, sends the request 442 to the portable device. Moreover, the wireline device, at 446, enables audio functionality on the wireline device to allow the subscriber to participate in the communication session, such as group calls. Furthermore, the wireline device sends a message 448, indicating to the portable device that the wireline device has transitioned to the active mode. Responsively, the portable device at 418, disables (i.e., turns off) its RF functionality and sends a message 452 to the wireline device, indicating that the portable device has transitioned to the inactive mode. Thereafter, the portable device is in the inactive mode at 420, and the wireline device is in the active mode at 450. Accordingly, the communication session is seamlessly transferred from the portable device to the wireline device.

Turning now to method 500 in FIG. 5, while the portable device is in the inactive mode at 502, the wireline device, at 518, is in the active mode to enable a subscriber associated with and using the companion devices to participate in a communication session over the underlying communication system. Moreover, the wireline device periodically provides and transfers synchronization data 520 to the portable device while the wireline device is in the active mode and the portable device is in the inactive mode and within a range of the wireline device. This synchronization data includes an updated set of session parameters (e.g., a change of talkgroup) for the communication session. The devices are in these modes until, at 504, the portable device receives a trigger indicating that the portable device should transition into the active mode. One example trigger is the pushing or pressing of a physical "active" key or button on the portable device by the subscriber. Pushing of the "active" key or button indicates a user selection of the portable device for transitioning to the active mode. Another example trigger is the roaming away of the portable device from the wireline device. In other words, the portable device leaves and is no longer within the range of the wireline device, and the companion devices no longer detect each other over the PAN between them. It is, thus, said that the devices "detect" that they are no longer within range of one another. Accordingly, the wireline device "detects" that the portable device has left the range of the wireline device; and the portable device "detects" that it is outside of the range of the wireline device.

Responsive to the trigger, the portable device, at 506, transitions into the active mode and enables (i.e., turns on) its RF functionality. Additionally, at 506, the portable device sends a portable device active message 508 to the wireline device. Responsive to the message 508, the wireline device disables its audio functionality at 522, and transitions into the inactive mode at 524. The wireline device also disables, at 522, its audio functionality whenever it detects that the portable is no long within range.

At 510, the portable device determines whether session parameters that it currently holds are updated session parameters received from the wireline device while the wireline device was in the active mode. If so, the portable device, at 512, uses the updated set of session parameters to continue its participation in the communication session. Otherwise, the portable device, at 514, continues its participation in the communication session using preconfigured settings, not the settings it currently maintains. Preconfigured settings can include, for example, a default channel ID assigned for media transmissions during a communication session. At 516, the portable device is in the active mode. Accordingly, the communication session is seamlessly transferred from the wireline device to the portable device.

Figure 6:
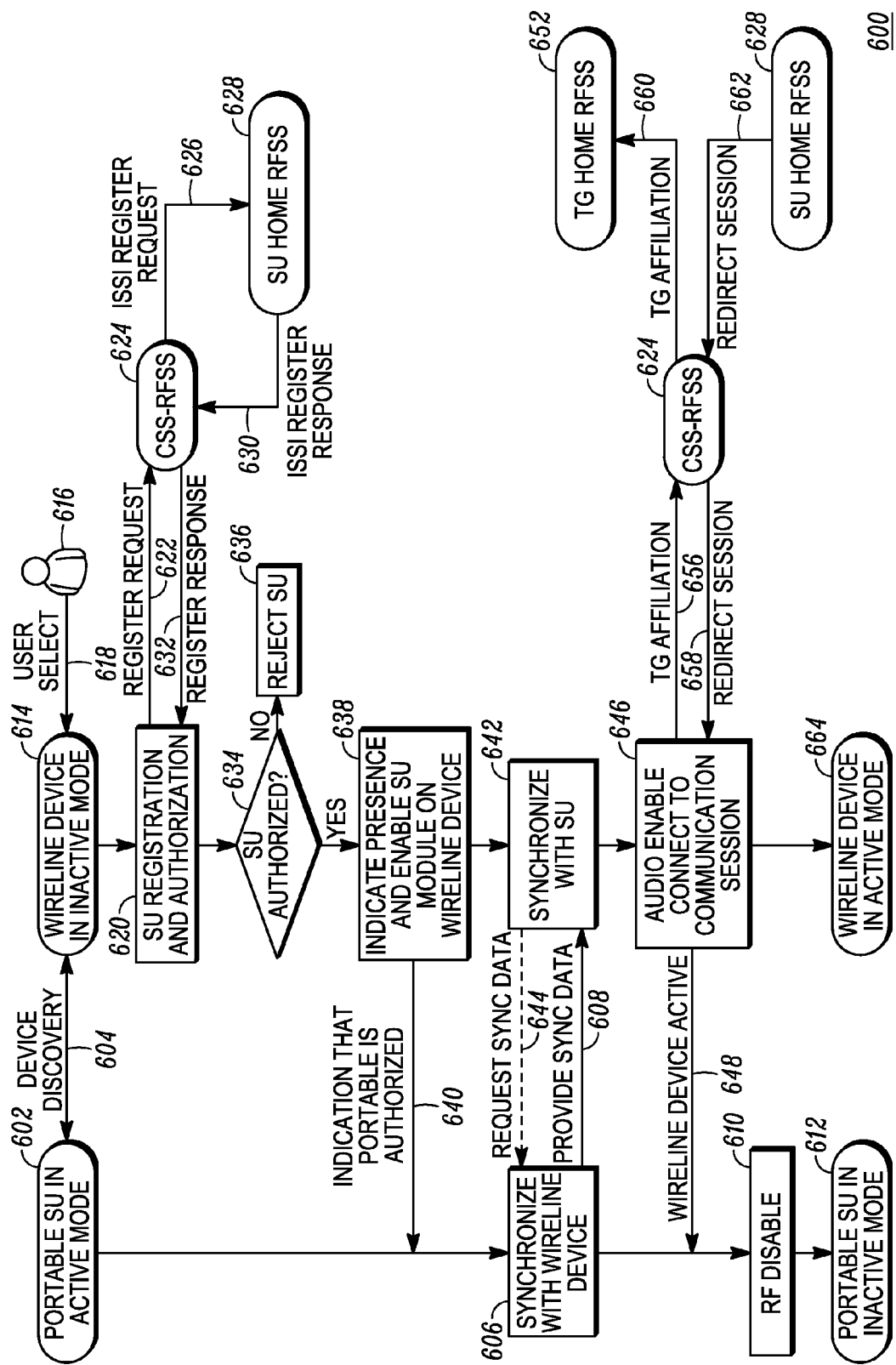
FIG. 6 is a logical flowchart illustrating a method for transferring a communication session between companion devices in accordance with some embodiments.
Figure 7:
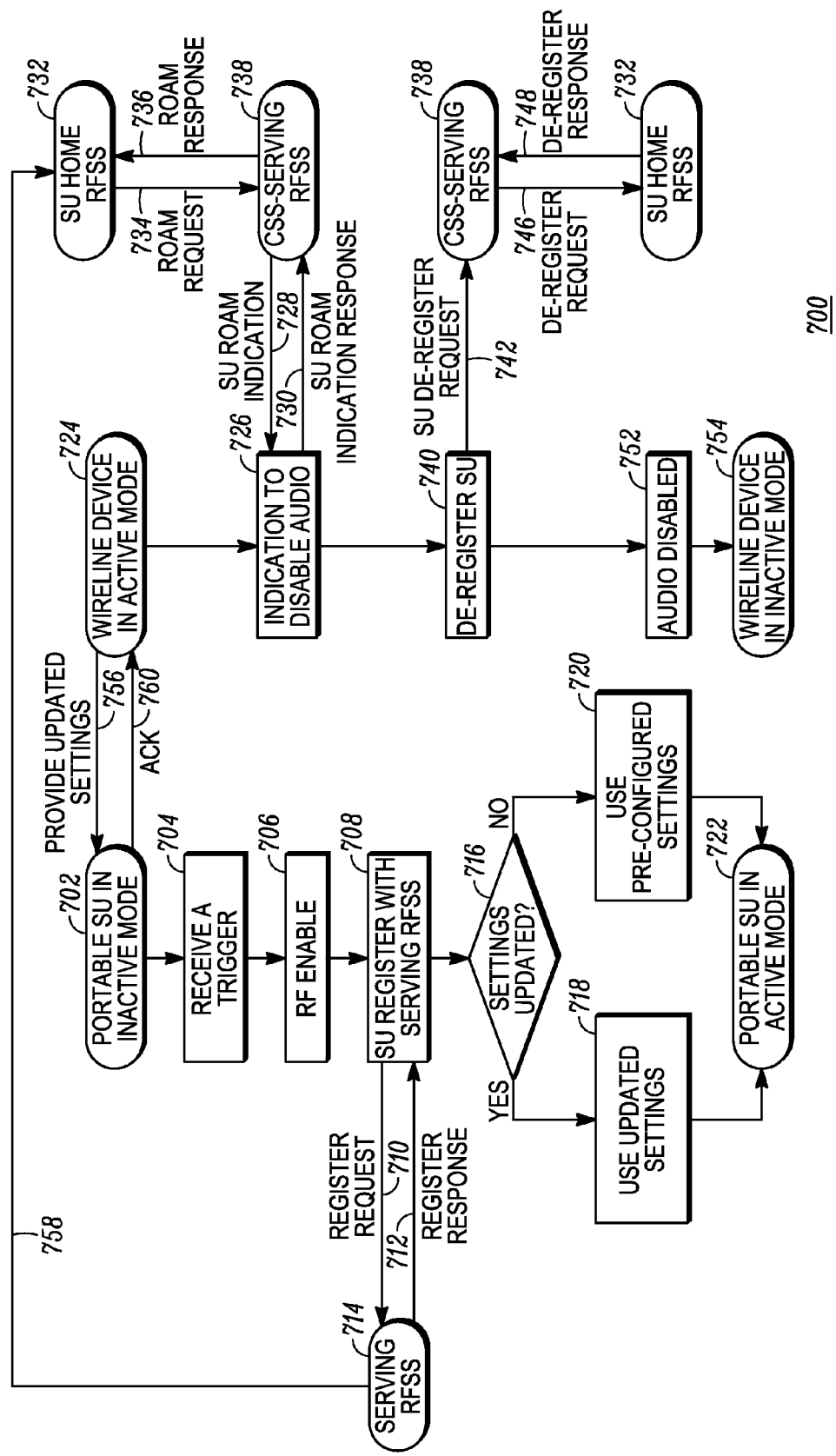
FIG. 7 is a logical flowchart illustrating a method for transferring a communication session between companion devices in accordance with some embodiments.

Turning now to FIGS. 6 and 7, each shows a logical flowchart illustrating a method for transferring a communication session between companion devices in accordance with some embodiments. Both method 600 and method 700 are performed by a pair of companion devices within the communication system 300. Turning first to method 600, at 602, the subscriber 616 of the pair of companion device uses the portable device (such as one of the portable devices 342-350) to participate in a communication session, such as a group call. Thus, initially the portable device is in the active mode 602 and the companion wireline device is the inactive mode 614 for the communication session. The portable device exchanges device discovery messages 604 with its companion wireline device to detect each other. Upon successful device detection, the wireline device, at 620, performs subscriber registration and authorization to establish a call segment between a new serving RFSS and the home RFSS for the portable device.

Here, the new serving RFSS is a CSS-RFSS 624 residing in a CSS controller (e.g., one of the CSS controllers 304, 308, and 312), which is connected to the wireline device. The CSS-RFSS 624, like any other RFSS, is assigned a unique P25 RFSS system ID and provisioned as a serving RFSS for each wireline device provisioned on the CSS controller that hosts the CSS-RFSS. Since each pair of companion devices share a same SUID (i.e., the SUID of the portable device), the CSS-RFSSs 624 is also termed herein to be a serving RFSSs for the companion portable device of the each wireline device. In accordance with embodiments of the present teachings, by using a CSS-RFSS as a serving RFSS, the wireline device can "emulate" the portable device by using the portable's SUID. So, to the underlying communication system, it looks like the portable device has roamed and has established a new call segment with the CSS-RFSS as the serving RFSS.

To establish the call segment, the wireline device sends a registration request 622 to a corresponding CSS-RFSS 624, which responsively sends a standard ISSI registration request 626 to a home RFSS 628 for the portable device. The home RFSS 628 performs registration and sends a standard ISSI registration response 630 to the CSS-RFSS 624, which responsively sends a registration response 632 to the wireline device. The registration procedure between the CSS-RFSS 624 and the home RFSS 628 is a standard ISSI registration procedure, which can be a standard P25 ISSI or TETRA ISI registration procedure. However, the registration procedure between the wireline device and the CSS-RFSS 624 can be either a standard or a proprietary registration procedure.

Additionally, the wireline device, at 620, performs authorization for the portable device by communicating with the CSS controller hosting the CSS-RFSS 624 (for instance as described above by reference to method 400 of FIG. 4). At 634, the wireline device determines whether the registration and authorization are successful. If either the registration or the authorization is not successful, the wireline device, at 636, rejects the portable device, and the subscriber 616 cannot transition to the wireline device to continue his ongoing communication session. Otherwise, at 638, the wireline device indicates its presence to the portable device by sending an indication 640 that the portable device is authorized as a companion device to the wireline device. The indication 640 further indicates that the wireline device is ready to synchronize with the portable device. Additionally, the wireline device, at 638, enables SU modules (e.g., computer program components) to support synchronization and seamless transferring of the communication session between the companion devices.

In response to the message 640, the portable device, at 606, synchronizes with the wireline device by transferring synchronization data 608 (e.g., current session parameters) to the wireline device. At 642, the wireline device receives and processes the synchronization data. Moreover, the wireline device may send a synchronization acknowledgement message (not shown) to the portable device. Alternatively, the wireline device, at 642, initiates the synchronization by sending a request 644 for synchronization data to the portable device. In response to the request 644, the portable device, at 606, transfers the synchronization data 608 to the wireline device. At 646, the wireline device transitions to the active mode (644) by enabling (i.e., turning on) audio functionality and connecting to the ongoing communication session (such as a talkgroup).

Where the communication session is a group call (also referred to herein as a talkgroup session), the wireline device connects to the session by sending a talkgroup affiliation message 656 (meaning a request to join the session) to the CSS-RFSS 624. The CSS-RFSS 624 responsively sends a standard P25 ISSI talkgroup affiliation message 660 to a home RFSS 652 assigned for the talkgroup. The message 660 causes a new call segment to be established between the serving CSS-RFSS 624 and the home RFSS 652. Accordingly, a seamless transition between companion devices, participating in a group call session, involves reestablishing a call segment between a new serving RFSS (such as the CSS-RFSS 624) and the group home RFSS (e.g., the home RFSS 652).

Where the communication session is a subscriber-to-subscriber (meaning one-to-one or unit-to-unit communication) session, the home RFSS 628 for the portable device deregisters the portable device from the previous serving RFSS, and, at 662, redirects the subscriber-to-subscriber session to the CSS-RFSS 624. In other words, the CSS-RFSS 624 becomes the new serving RFSS for the portable device while the subscriber 616 uses the wireline device to participate in the communication session. Responsively, the CSS-RFSS 624 redirects the session to the wireline device, at 658.

At 646, the wireline device further sends a wireline device active message 648 (indicating that the wireline device is in the active mode) to the portable device. Responsive to the message 648, the portable device, at 610, disables (i.e., turns off) its RF functionality. Thereafter, the portable device transitions to the inactive mode at 612 and the wireline device transitions to the active mode at 664. Accordingly, the communication session is seamlessly transferred from the portable device to the wireline device. This seamless transition can be triggered by a number of events. For example, the subscriber 616 clicks a button to generate a user input into a UI to a computer program running on the wireline device. In another example, the subscriber 616 connects the portable device to the wireline device over a USB link. Accordingly, in response to the user input, the wireline device is transitioned to the active mode and the portable device is transitioned to the inactive mode, for the communication session.

Referring now to method 700 in FIG. 7, while the portable device is in the inactive mode at 702 and the wireline device is in the active mode at 724, the wireline device periodically provides and transfers synchronization data 756 (e.g., updated session parameters) to the portable device. Responsively, the portable device sends an acknowledgement message 760 to the wireline device. The message 760 further serves the function of a beacon message that indicates the presence of the portable device. Accordingly, failing to receive the message 760 by the wireline device means the wireline device detecting that its companion portable device has left the range of the wireline device.

At 704, the portable device receives a trigger indicating that the portable device should transition into an active mode. For example, the trigger occurs when the subscriber presses a physical Active key or button on the portable device. In another example, the trigger occurs when the portable device roams away and it can no longer receive messages, such as beacon messages, from the wireline device. In other words, the companion devices lost each other. In yet another example, the trigger occurs where the portable device is removed from a USB cradle connected to the wireline device. Responsive to the trigger, the portable device, at 706, enables its RF functionality. At 708, the portable device registers with its serving RFSS 714 by sending a standard P25 register request (i.e., registration request) 710 using the standard P25 CAI. Responsively, the serving RFSS 714 sends a standard P25 register response (i.e., registration response) 712 to the portable device.

Additionally, the serving RFSS 714 sends a standard ISSI register request (including a SUID of the portable device) 758 to a home RFSS 732 for the portable device. Responsively, the home RFSS 732 sends a standard P25 roam request 734 to the CSS-RFSS 738. The CSS-RFSS 738 resides in the CSS controller that connects to the wireline device. In response to the roam request 734, the CSS-RFSS 738 sends a roam indication message 728 to the wireline device (thereby, indicating that the wireline device should transition to the inactive mode), which responsively replies with a roam indication response 730 at 726. Correspondingly, the CSS-RFSS 738 sends a standard P25 roam response 736 to the home RFSS 732. The roaming procedure between the home RFSS 732 and the CSS-RFSS 738 is a standard ISSI roaming procedure, which can be a standard P25 ISSI roaming procedure. However, the roaming procedure between the wireline device and the CSS-RFSS 738 can be either a standard or a proprietary roaming procedure.

At 726, in response to the roam indication message 728, the wireline device disables audio functionality within the wireline device. At 740, the wireline device deregisters itself from the CSS-RFSS 738 by sending a deregister request (i.e., deregistration request) 742 to the CSS-RFSS 738. Responsively, the CSS-RFSS 738 sends a standard ISSI deregister request 746 to the home RFSS 732 of the portable device. In response to the request 746, the home RFSS 732 sends a standard deregister response (i.e., deregistration response) 748 to the CSS-RFSS 738. The deregistration procedure between the CSS-RFSS 738 and the home RFSS 732 is a standard ISSI deregistration procedure, which can be a standard P25 ISSI or TETRA ISI deregistration procedure. However, the deregistration procedure between the wireline device and the CSS-RFSS 738 can be either a standard or a proprietary deregistration procedure. Similarly, the registration procedure between the portable device and the serving RFSS 714 can be either a standard or a proprietary registration procedure. Where the subscriber logs out from the wireline device, the wireline device also performs element 740. At 752, the wireline device disables audio functionality within the wireline device and transitions to the inactive mode (754).

At 716, the portable device determines whether its current set of session parameters is an updated set of session parameters received from the wireline device while the wireline device was in the active mode. If so, the portable device, at 718, uses the updated set of session parameters to continue its participation in the communication session. Otherwise, the portable device, at 720, continues its participation in the communication session using preconfigured settings, not the current settings it maintains. The portable device, at 722, transitions to the active mode, while the wireline device, at 754, transitions to the inactive mode. Accordingly, the communication session is seamlessly transferred from the wireline device to the portable device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for transferring a communication session between companion devices as described herein. The non-processor circuits may include, but are not limited to, a radio receiver, a radio transmitter, signal drivers, clock circuits, power source circuits, and user input devices. As such, these functions may be interpreted as steps of a method to perform the transferring of a communication session between companion devices described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transferring a communication session between companion devices, the method performed by a portable wireless communication device having an identifier, the method comprising:

connecting to a communication session over a communication system using a current set of session parameters and the identifier for the portable wireless communication device, wherein the portable wireless communication device is in an active mode for the communication session;

detecting that the portable wireless communication device is within a range of a companion wireline communication device that is configured with the identifier for the portable wireless communication device;

synchronizing, by the portable communication device, with the companion wireline communication device, wherein the synchronizing comprises transferring, by the portable communication device, the current set of session parameters to the companion wireline communication device to use with the identifier for the portable wireless communication device for connecting to the communication session and wherein the session parameters comprise one or more identifiers of a talkgroup associated with the communication session;

receiving an indication that the companion wireline communication device is in the active mode for the communication session; and responsive to the indication, transitioning the portable wireless communication device to an inactive mode for the communication session.

2. The method of claim 1 further comprising:
receiving a trigger; and
responsive to the trigger, transitioning the portable wireless communication device from the inactive mode to the active mode for the communication session, wherein the companion wireline communication device correspondingly transitions to the inactive mode for the communication session.

3. The method of claim 2, wherein the trigger comprises a user selection for the portable wireless communication device to transition to the active mode.

4. The method of claim 2, wherein the trigger comprises detecting that the portable wireless communication device is outside of the range of the companion wireline communication device.

5. The method of claim 2 further comprising, the portable wireless communication device:
receiving an updated set of session parameters for the communication session from the companion wireline communication device while the companion wireline communication device is in the active mode and the portable wireless communication device is in the inactive mode; and
connecting to the communication session using the updated set of session parameters while the portable wireless communication device is in the active mode and the companion wireline communication device is in the inactive mode for the communication session.

6. The method of claim 1, wherein the current set of session parameters comprises a channel identifier for a channel assigned for media transmissions of the communication session.

7. The method of claim 1, wherein detecting that the portable wireless communication device is within the range of the companion wireline communication device comprises detecting that the portable wireless communication device has a physical connection to the companion wireline communication device, and the method further comprises receiving a battery charge through the physical connection.

8. The method of claim 1 further comprising registering with a console subsystem controller that is provisioned as a serving radio frequency subsystem for the portable wireless communication device and the companion wireline communication device, wherein the registering is performed through the companion wireline communication device and the registering initiates a standard inter-system interface registration procedure between the console subsystem controller and a home radio frequency subsystem to connect the companion wireline communication device to the communication session using the current set of session parameters and the identifier for the portable wireless communication device.

9. The method of claim 8, wherein the standard inter-system interface registration procedure comprises a Project 25 inter-RF subsystem interface registration procedure.

10. The method of claim 1, wherein the communication session is a group call, and the current set of session parameters comprises an identifier for the group call.

11. The method of claim 1, wherein the communication session is a unit-to-unit call, and the current set of session parameters comprises an identifier for a destination unit.

12. The method of claim 1, wherein the current set of session parameters comprises an emergency indication.

13. The method of claim 1, wherein the synchronizing is performed using a security key and a secure protocol.

14. A method for transferring a communication session between companion devices, the method performed by a wireline communication device configured with an identifier for a companion portable wireless communication device, the method comprising:
detecting that the companion portable wireless communication device is within a range of the wireline communication device, wherein the companion portable wireless communication device is in an active mode for a communication session, wherein the companion portable wireless communication device is connected to a communication system using the identifier for the companion portable wireless communication device and a current set of session parameters for the communication session;
synchronizing with the companion portable wireless communication device, wherein the synchronizing comprises receiving the current set of session parameters and wherein the session parameters comprise one or more identifiers of a talkgroup associated with the communication session; and
responsive to user input, transitioning the wireline communication device to the active mode for the communication session, wherein the wireline communication device is connected to the communication system using the identifier for the companion portable wireless communication device and the current set of session parameters for the communication session, when the companion portable wireless communication device is in an inactive mode for the communication session.

15. The method of claim 14 further comprising the wireline communication device periodically sending to the companion portable wireless communication device an updated set of session parameters for the communication session while the wireline communication device is in the active mode for the communication session, and the companion portable wireless communication device is simultaneously in the inactive mode for the communication session.

16. The method of claim 15 further comprising:
detecting that the companion portable wireless communication device has left the range of the wireline communication device; and
responsively transitioning to the inactive mode for the communication session while the companion portable wireless communication device is in the active mode for the communication session, wherein the companion portable wireless communication device is connected to the communication system using the identifier for the companion portable wireless communication device and the updated set of session parameters for the communication session.

17. The method of claim 16, wherein detecting that the companion portable wireless communication device has left the range of the wireline communication device comprises at least one of: failing to receive a beacon message from the companion portable wireless communication device; receiving a roaming message from a home radio frequency subsystem for the companion portable wireless communication device; or receiving an indication that a user has logged out of the wireline communication device.

18. The method of claim 16 further comprising de-registering from a console subsystem controller that is provisioned as a serving radio frequency subsystem for the wireline communication device and companion portable wireless communication device, wherein the de-registering initiates a standard inter-system interface de-registration procedure between the console subsystem controller and a home radio frequency subsystem.

19. A method for transferring a communication session between companion devices, the method performed by a Project 25 console subsystem controller that is enhanced to function as a serving radio frequency subsystem for a portable wireless communication device and companion wireline communication device pair, the method comprising:
  receiving a registration request for the portable wireless communication device from the companion wireline communication device, wherein the companion wireline communication device is in an inactive mode for a communication session, and the portable wireless communication device is in an active mode for the communication session, wherein the registration request includes an identifier for the portable wireless communication device;
  responsive to receiving the registration request, sending a standard Project 25 inter-RF subsystem interface registration request that includes the identifier for the portable wireless communication device to cause the console subsystem controller to become registered with a home radio frequency subsystem for the portable wireless communication device as the serving radio frequency subsystem for the portable wireless communication device, wherein the portable wireless communication device transitions to the inactive mode for the communication session and the companion wireline communication device transitions to the active mode for communicating media over a standard Project 25 inter-RF subsystem interface between the console subsystem controller and the home radio frequency subsystem for the portable wireless communication device.

20. The method of claim 19 further comprising:
  receiving an affiliation request for the portable wireless communication device from the companion wireline communication device, wherein the affiliation request includes the identifier for the portable wireless communication device and an identifier for a group call; and
  responsive to receiving the affiliation request, sending a standard Project 25 affiliation request that identifies the communication session to a home radio frequency subsystem for the group call to cause the Project 25 console subsystem controller to become the serving radio frequency subsystem for communicating media over a standard Project 25 inter-RF subsystem interface between the Project 25 console subsystem controller and the home radio frequency subsystem for the group call.

* * * * *